US011334559B2

(12) United States Patent
Anokhina et al.

(10) Patent No.: US 11,334,559 B2
(45) Date of Patent: May 17, 2022

(54) METHOD OF AND SYSTEM FOR IDENTIFYING ABNORMAL RATING ACTIVITY

(71) Applicant: YANDEX EUROPE AG, Lucerne (CH)

(72) Inventors: Marina Aleksandrovna Anokhina, Moscow (RU); Sergey Vyacheslavovich Statyev, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 34 days.

(21) Appl. No.: 16/869,951

(22) Filed: May 8, 2020

(65) Prior Publication Data

US 2021/0073203 A1    Mar. 11, 2021

(30) Foreign Application Priority Data

Sep. 9, 2019  (RU) ................................ 2019128284

(51) Int. Cl.
*G06F 16/23*     (2019.01)
*G06F 16/9536*   (2019.01)
*G06F 16/901*    (2019.01)

(52) U.S. Cl.
CPC ...... *G06F 16/2365* (2019.01); *G06F 16/9024* (2019.01); *G06F 16/9536* (2019.01)

(58) Field of Classification Search
None
See application file for complete search history.

(56) References Cited

U.S. PATENT DOCUMENTS

| 7,519,562 B1 | 4/2009  | Vander et al.  |
| 7,610,276 B2 | 10/2009 | Yomtobian      |
| 7,827,054 B2 | 11/2010 | Campbell et al.|
| 7,877,800 B1 | 1/2011  | Satish et al.  |

(Continued)

FOREIGN PATENT DOCUMENTS

| CN | 103853744 A | 6/2014 |
| RU | 2608886 C2  | 1/2017 |
| RU | 2609079 C2  | 1/2017 |

OTHER PUBLICATIONS

"Search Engine Click Spam Detection Based on Bipartite Graph Propagation" http://www.thuir.cn/group/~YQLiu/publications/wsdm2014.pdf, published in WSDM '14 Proceedings of the 7th ACM international conference on Web search and data mining on Feb. 24, 2014, retrieved on Oct. 9, 2019.

(Continued)

*Primary Examiner* — Giuseppi Giuliani
(74) *Attorney, Agent, or Firm* — BCF LLP

(57) ABSTRACT

There is disclosed a method and system for determining users submitting abnormal organization ratings. The method comprises retrieving organization rating activity. The method comprises generating a graph of the organization rating activity and determining a complete subgraph in the graph. The method then comprises determining whether the ratings for the subgraph satisfy a threshold distribution, and after determining that the ratings do satisfy the threshold distribution, storing an indication that the users who submitted those ratings are associated with abnormal organization ratings.

14 Claims, 9 Drawing Sheets

(56) References Cited

U.S. PATENT DOCUMENTS

| | | |
|---|---|---|
| 8,578,462 B2 | 11/2013 | Petrovic |
| 8,661,299 B1 | 2/2014 | Ip |
| 8,966,631 B2 | 2/2015 | El-Moussa et al. |
| 9,047,628 B2 | 6/2015 | Mislove et al. |
| 9,092,510 B1 | 7/2015 | Stets et al. |
| 9,183,387 B1 | 11/2015 | Altman et al. |
| 9,241,010 B1 | 1/2016 | Bennett et al. |
| 9,349,134 B1 | 5/2016 | Adams et al. |
| 9,479,516 B2 | 10/2016 | Mote et al. |
| 9,652,354 B2 | 5/2017 | Filimonov et al. |
| 9,672,242 B2 | 6/2017 | Jung et al. |
| 9,811,566 B1 | 11/2017 | Kim et al. |
| 9,846,896 B2 | 12/2017 | Shah et al. |
| 9,866,566 B2 | 1/2018 | Dulkin et al. |
| 9,870,596 B2 | 1/2018 | Babinowich et al. |
| 10,009,358 B1 | 6/2018 | Xie et al. |
| 10,084,816 B2 | 9/2018 | Zhang et al. |
| 10,089,660 B2 | 10/2018 | Luan et al. |
| 10,218,733 B1 | 2/2019 | Amidon et al. |
| 2005/0262026 A1 | 11/2005 | Watkins et al. |
| 2008/0162475 A1 | 7/2008 | Meggs et al. |
| 2008/0172271 A1 | 7/2008 | Wee et al. |
| 2008/0301090 A1 | 12/2008 | Sadagopan et al. |
| 2008/0301811 A1 | 12/2008 | Jung |
| 2009/0049547 A1 | 2/2009 | Fan |
| 2009/0083184 A1 | 3/2009 | Eisen et al. |
| 2010/0082510 A1 | 4/2010 | Gao et al. |
| 2011/0055104 A1 | 3/2011 | Sun et al. |
| 2011/0208714 A1 | 8/2011 | Soukal et al. |
| 2012/0233692 A1 | 10/2012 | Oh et al. |
| 2013/0173616 A1* | 7/2013 | Fekri .................. G06Q 30/0609 707/736 |
| 2013/0332468 A1 | 12/2013 | Hardas et al. |
| 2014/0114877 A1 | 4/2014 | Montano |
| 2014/0214570 A1 | 7/2014 | Smolev et al. |
| 2015/0205862 A1 | 7/2015 | Campagne et al. |
| 2015/0264073 A1 | 9/2015 | Tavakoli et al. |
| 2015/0326674 A1 | 11/2015 | Kruglick et al. |
| 2015/0341383 A1 | 11/2015 | Reddy et al. |
| 2016/0065600 A1 | 3/2016 | Lee et al. |
| 2016/0092774 A1* | 3/2016 | Wang .................. G06F 16/285 706/12 |
| 2016/0196566 A1 | 7/2016 | Murali et al. |
| 2016/0259742 A1 | 9/2016 | Faulkner et al. |
| 2016/0321711 A1 | 11/2016 | Wouhaybi et al. |
| 2017/0220971 A1 | 8/2017 | Giammaria et al. |
| 2017/0221111 A1 | 8/2017 | Salehi et al. |
| 2017/0230229 A1 | 8/2017 | Sasturkar et al. |
| 2017/0272458 A1 | 9/2017 | Muddu et al. |
| 2017/0344555 A1 | 11/2017 | Yan et al. |
| 2018/0048658 A1 | 2/2018 | Hittel et al. |
| 2018/0196684 A1 | 7/2018 | Pengfei et al. |
| 2018/0218295 A1 | 8/2018 | Hasija et al. |
| 2018/0278647 A1 | 9/2018 | Gabaev et al. |
| 2018/0357683 A1 | 12/2018 | Pickover et al. |
| 2019/0034986 A1 | 1/2019 | Robinson et al. |
| 2019/0379700 A1 | 12/2019 | Canzanese et al. |
| 2020/0012981 A1 | 1/2020 | Davison et al. |
| 2020/0311309 A1 | 10/2020 | Dawer et al. |
| 2020/0342006 A1 | 10/2020 | Rossi et al. |

OTHER PUBLICATIONS

Walgampaya "Cracking the Smart ClickBot", Conference: 13th IEEE International Symposium on Web Systems Evolution, WSE 2011, Williamsburg, VA, USA, Sep. 30, 2011 Cite this publication, DOI: 10.1109/WSE.2011.6081830 , retrieved on Oct. 9, 2019.

Yafeng "Positive Unlabeled Learning for Deceptive Reviews Detection", Wuhan University, published in Proceedings of the 2014 Conference on Empirical Methods in Natural Language Processing (EMNLP), retrieved on Oct. 9, 2019.

Office Action dated May 13, 2021 received in respect of a related U.S. Appl. No. 16/869,878.

Notice of Allowance dated Jun. 24, 2021 received in respect of a related U.S. Appl. No. 16/869,282.

Notice of Allowance dated Apr. 2, 2021 received in respect of a related U.S. Appl. No. 16/868,363.

Russian Search Report dated Mar. 23, 2022 issued in respect of the counterpart Russian Patent Application No. RU 2019128284.

* cited by examiner

METHOD OF AND SYSTEM FOR IDENTIFYING ABNORMAL RATING ACTIVITY

CROSS-REFERENCE

The present application claims priority to Russian Patent Application No. 2019128284, entitled "Method of and System for Identifying Abnormal Rating Activity", filed Sep. 9, 2019, the entirety of which is incorporated herein by reference.

FIELD

The present technology relates to detecting abnormal rating activity in general and, more specifically, to a method of and a system for determining users submitting abnormal ratings of organizations.

BACKGROUND

The volume of available information through various Internet resources has grown exponentially over the past few decades. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results.

The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results). Additional information relating to the ranked list of search results may be provided to the user. An organization rating may be included for each organization included in the ranked list. The organization rating may be calculated based on user-submitted ratings of the organization related to the search result.

The search engines typically provide a good search tool for a search query that the user knows apriori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

When the user submits a search query, the search engine generates a list of relevant web resources (based on an analysis of crawled web resources, an indication of which is stored in a crawler database in a form of posting lists or the like). The search engine then ranks the so-generated list of search results. The generation of the list and/or ranking of search results may be performed by various means, such as by executing a machine learning algorithm (MLA). The MLA ranks the list of search results based on their relevancy to the search query. The MLA is "trained" to predict relevancy of the given search result to the search query based on a plethora of "features" associated with the given search result, as well as indications of past users' interactions with search results when submitting similar search queries in the past.

In order to rank the list of search results, various factors are considered, such as previously recorded web search history and/or organization ratings for organizations associated with the results. As described above, the search results may include organizations, and each organization may be associated with a corresponding organization rating. Users may have provided ratings for the organizations, such as by submitting a rating on a numerical scale (such as one to ten) or a binary rating (positive or negative). Those individual organization ratings may be averaged, or otherwise used, to calculate an overall organization rating for the organization. The individual and/or overall organization ratings may be used when determining a ranking of the organization in the list of search results. The overall organization rating may be displayed, such as in the search results. When reviewing search results, users are typically more likely to select organizations with a higher displayed organization rating.

Website promoters know that organization ratings can increase page visits and can be influential on the search rankings. Some bad actors try to increase the overall organization rating of an organization by instructing users to submit a specified organization rating for that organization. For example the user may be instructed to submit a high organization rating for the organization that the bad actor wishes to promote, and a low organization rating for a competitor of the organization. The bad actors may pay the users to submit these organization ratings, which are referred to herein as abnormal organization ratings. These abnormal organization ratings can cause organizations to have higher displayed overall organization ratings, and/or to be ranked higher in response to a query. When users are shown overall organization ratings that are calculated using abnormal organization ratings, the user's satisfaction with the search engine will decrease because the overall organization rating doesn't reflect user's natural opinion of the organization.

U.S. Pat. No. 10,009,358 issued to DataVisor Inc., on Jun. 26, 2018, discloses methods, systems, and apparatus, including computer programs encoded on computer storage media, for detecting malicious attacks. One of the methods includes generating a collection of hypergraphs representing user events across a collection of users; analyzing the collection of hypergraphs to determine a group of malicious user accounts or account activities satisfying a threshold confidence; using the group of malicious user accounts or account activities as training data for a machine learning system that generates one or more classifiers; and using the one or more generated classifiers to output additional malicious user accounts or account activities.

U.S. Pat. No. 9,183,387 issued to Google Inc., on Nov. 10, 2015, discloses Detecting online attacks, including identifying one or more events associated with users on a social graph. For each type of event of the one or more events, generating at least one directed acyclic graph (DAG), where each node on the DAG represents a node on the social graph where an event of the type occurs and each edge on the DAG represents a propagation of the event from a first node of the edge to a second node of the edge.

Positive Unlabeled Learning for Deceptive Reviews Detection, published in Proceedings of the 2014 Conference on Empirical Methods in Natural Language Processing (EMNLP), discloses deceptive reviews detection by modeling PU (positive unlabeled) learning. A semi-supervised model, called mixing population and individual property PU learning (MPIPUL), is proposed. Firstly, some reliable negative examples are identified from the unlabeled dataset. Secondly, some representative positive examples and negative examples are generated based on LDA (Latent Dirichlet Allocation). Thirdly, for the remaining unlabeled examples (called spy examples), which can not be explicitly identified as positive and negative, two similarity weights are assigned, by which the probability of a spy example belonging to the positive class and the negative class are displayed. Finally, spy examples and their similarity weights are incorporated into SVM (Support Vector Machine) to build an accurate classifier.

SUMMARY

Developers of the present technology have appreciated at least one technical problem associated with the prior art approaches.

The present technology relates to detecting abnormal web activity in general, and more specifically to methods and systems for determining users submitting abnormal organization ratings. As has been alluded to above, various bad actors may seek to influence the ratings submitted for an organization. For example, a user may be given instructions to submit a specific rating for an organization. Various techniques have been developed for identifying abnormal organization rating behavior.

Search engine operators and organization recommendation companies, such as Google™, Yandex™, Bing™, Yahoo™, and Yelp™ among others, have access to a large amount of organization rating data. This organization rating data may be used to identify abnormal organization ratings.

When users submit abnormal organization ratings, such as when they are being instructed to submit an organization rating, the users typically submit either very high or very low ratings for the organizations. Also, the users that are submitting abnormal organization ratings usually rate multiple organizations. Users that are submitting naturally occurring ratings, or in other words ratings based on their own experiences rather than outside influences, typically submit organization ratings that fall in a more even distribution across the scale of ratings. The abnormal organization ratings can be discerned from the naturally occurring organization ratings using these differences.

In accordance with non-limiting embodiments of the present technology, organization rating activity may be collected, where the organization rating activity includes user-submitted ratings of organizations. The ratings can be binary, such as a thumbs-up or thumbs-down type rating, and/or scale ratings, such as ratings on a one (negative rating) to ten (positive rating) scale. Each user-submitted rating in the organization rating activity may include an identifier of a user that submitted the rating, such as a user ID.

In accordance with the non-limiting embodiments of the present technology, a graph of the organization rating activity may be generated. Each user in the organization rating activity may be placed in the graph as a node. Each organization that was rated in the organization rating activity may be placed in the graph as a node. For each rating in the organization rating activity an edge may be placed in the graph, where the edge connects the user that submitted the rating to the organization that was rated.

In accordance with the non-limiting embodiments of the present technology, another graph of the organization rating activity may be generated. In this second graph, the organizations in the organization rating activity may be nodes. Edges may connect organizations that were both rated by at least one common user. The edges may be weighted. The weights of the edges may indicate the number of users that submitted an organization rating for both the first organization and the second organization connected by the edge.

In accordance with the non-limiting embodiments of the present technology, complete subgraphs may be identified in the graph. In the complete subgraph, each organization (i.e. node) may be connected by an edge to every other organization in the complete subgraph. The ratings for the organizations in the subgraph may then be retrieved. The ratings may be filtered to remove ratings from users who rated fewer than a threshold number of organizations in the subgraph. A distribution of the ratings may be determined. Organizations that have received abnormal organization ratings may have a relatively large number of either highly positive or highly negative organization ratings. If the distribution satisfies a threshold distribution, the organization ratings for those organizations may be deemed to be abnormal organization ratings. An indication may be stored for each of the users that provided the abnormal organization ratings. The abnormal organization ratings may be removed from the stored organization rating activity.

According to a first broad aspect of the present technology, there is provided a method for determining users performing abnormal organization ratings. The method is executable on a server and comprises: retrieving organization rating activity, wherein the organization rating activity comprises a plurality of organizations and one or more ratings for each organization; generating a graph of the organization rating activity, wherein each node in the graph corresponds to an organization of the plurality of organizations, and wherein each edge of the graph connects two organizations and is assigned a weight that indicates a number of users that have rated the two organizations connected by the respective edge; determining, in the graph, a complete subgraph, wherein each node in the subgraph is connected to all other nodes in the subgraph; determining whether the ratings corresponding to the subgraph satisfy a threshold distribution; and after determining that the ratings corresponding to the subgraph satisfy the threshold distribution, storing an indication that users corresponding to the subgraph are associated with abnormal organization ratings.

In some implementations of the method, the method further comprises removing, from the graph, edges having a weight below a predetermined threshold weight.

In some implementations of the method, the method further comprises removing, from the subgraph, information corresponding to users who have rated fewer than a predetermined threshold number of organizations in the subgraph.

In some implementations of the method, the method further comprises removing, from the organization rating activity, ratings corresponding to the users associated with abnormal organization ratings.

In some implementations of the method, the one or more ratings comprise binary ratings or scale ratings.

In some implementations of the method, the determining that the ratings corresponding to the subgraph satisfy the threshold distribution comprises: retrieving the ratings corresponding to the subgraph; determining a percentage of the ratings that are highest or lowest available ratings; and determining whether the percentage satisfies a threshold percentage.

In some implementations of the method, the method further comprises before generating the graph of the organization rating activity, generating a preliminary graph of the organization rating activity, wherein each node in the preliminary graph corresponds to either an organization of the plurality of organizations or a user that has rated an organization, and wherein each edge connects a user to an organization that the user has rated.

In some implementations of the method, the retrieving the organization rating activity comprises retrieving organization rating activity that was collected during a predetermined time period.

In some implementations of the method, the determining that the ratings corresponding to the subgraph satisfy the threshold distribution comprises: retrieving the ratings corresponding to the subgraph; determining a number of the ratings that are above a threshold high rating; and determining a number of the ratings that are below a threshold low rating.

In some implementations of the method, the method further comprises comparing the number of the ratings that are above the threshold high rating and the number of the ratings that are below the threshold low rating to a total number of the ratings.

In some implementations of the method, the determining the complete subgraph comprises determining a subgraph that satisfies a predetermined threshold number of nodes.

In accordance with yet another broad aspect of the present technology, there is provided a system for determining users performing abnormal organization ratings. The system comprises a processor and a non-transitory computer-readable medium comprising instructions. The processor, upon executing the instructions, is configured to: retrieve organization rating activity, wherein the organization rating activity comprises a plurality of organizations and one or more ratings for each organization; generate a graph of the organization rating activity, wherein each node in the graph corresponds to an organization of the plurality of organizations, and wherein each edge of the graph connects two organizations and is assigned a weight that indicates a number of users that have rated the two organizations connected by the respective edge; determine, in the graph, a complete subgraph, wherein each node in the subgraph is connected to all other nodes in the subgraph; determine whether the ratings corresponding to the subgraph satisfy a threshold distribution; and after determining that the ratings corresponding to the subgraph satisfy a threshold distribution, storing an indication that users corresponding to the subgraph are associated with abnormal organization ratings.

In some implementation of the system, the processor, upon executing the instructions, is further configured to remove, from the graph, edges having a weight below a predetermined threshold weight.

In some implementation of the system, the processor, upon executing the instructions, is further configured to remove, from the subgraph, information corresponding to users who have rated fewer than a predetermined threshold number of organizations in the subgraph.

In some implementation of the system, the processor, upon executing the instructions, is further configured to remove, from the organization rating activity, ratings corresponding to the users associated with abnormal organization ratings.

In accordance with yet another broad aspect of the present technology, there is provided a method for determining users performing abnormal organization ratings. The method is executable on a server and comprises: retrieving organization rating activity, wherein the organization rating activity comprises a plurality of organizations and one or more ratings for each organization; determining, from the organization rating activity, a set of organizations, wherein each organization in the set of organizations shares, with every other organization in the set of organizations, at least one common user that has rated both organizations; retrieving the ratings corresponding to the set of organizations; determining that the ratings have an abnormal distribution; and storing an indication that users that have rated two or more organizations in the set of organizations are associated with abnormal organization ratings.

In some implementations of the method, the method further comprises removing, from the ratings, ratings corresponding to users who have rated fewer than a predetermined threshold number of organizations in the set of organizations.

In some implementations of the method, the determining that the ratings have an abnormal distribution comprises: determining a percentage of the ratings that are highest or lowest available ratings; and determining whether the percentage satisfies a threshold percentage.

In some implementations of the method, the determining that the ratings have an abnormal distribution comprises: determining a metric corresponding to a distribution of the ratings; and comparing the metric to a predetermined normal distribution metric.

In some implementations of the method, the storing the indication that the users that have rated two or more organizations in the set of organizations are associated with abnormal organization ratings comprises storing the indication for users that have rated above a predetermined threshold number of organizations in the set of organizations.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server."

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drives, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first," "second," "third," etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
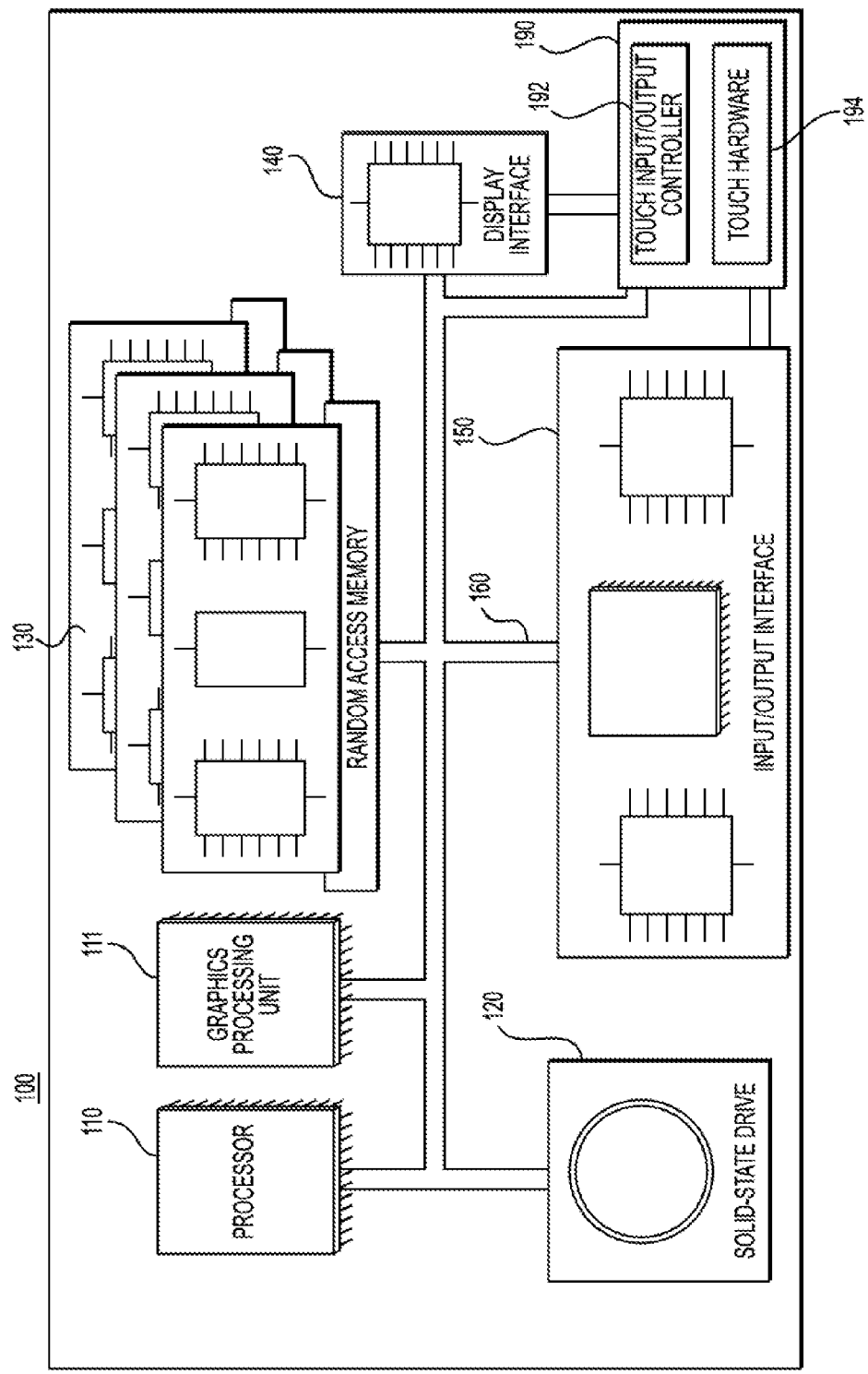
FIG. 1 is an illustration of components and features of a computing device in accordance with embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is shown a computing device 100 suitable for use with some implementations of the present technology. The computing device 100 comprises various hardware components including one or more single or multi-core processors collectively represented by processor 110, a graphics processing unit (GPU) 111, a solid-state drive 120, a random access memory 130, a display interface 140, and an input/output interface 150.

Communication between the various components of the computing device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computing device 100 in addition to or instead of the touchscreen 190.

According to implementations of the present technology, the solid-state drive 120 stores program instructions suitable for being loaded into the random access memory 130 and executed by the processor 110 and/or the GPU 111. For example, the program instructions may be part of a library or an application.

The computing device 100 may be a server, a desktop computer, a laptop computer, a tablet, a smartphone, a personal digital assistant or any device that may be configured to implement the present technology, as should be understood by a person skilled in the art.

Figure 2:
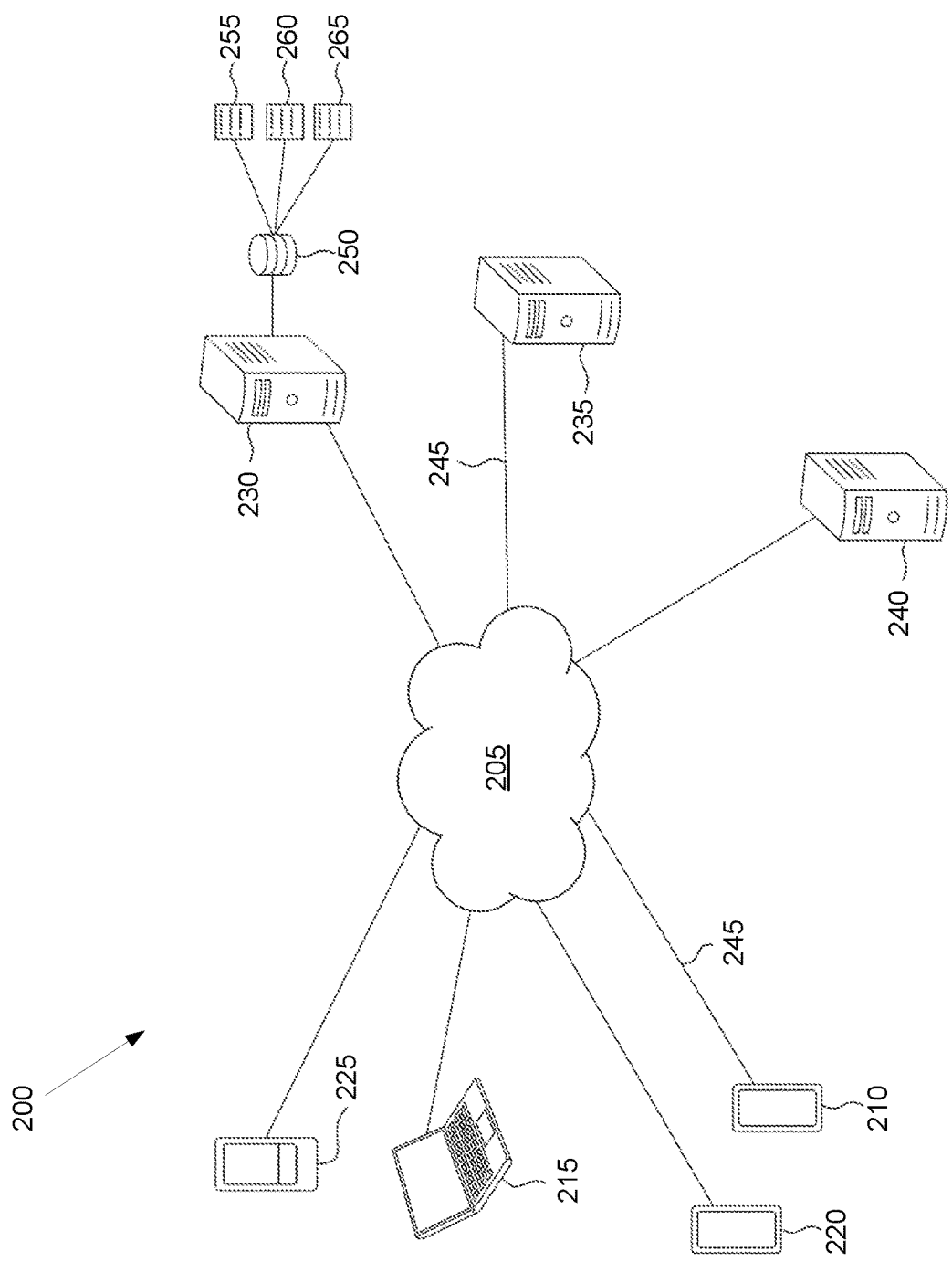
FIG. 2 depicts a diagram of a system implemented in accordance with non-limiting embodiments of the present technology.

With reference to FIG. 2, there is depicted a system 200, the system 200 implemented according to non-limiting embodiments of the present technology. The system 200 comprises a first client device 210, a second client device 215, a third client device 220, and a fourth client device 225, each coupled to a communications network 205 via a respective communication link 245. The system 200 comprises a search engine server 230, an analytics server 235 and an abnormal organization rating detection server 240 coupled to the communications network 205 via their respective communication link 245.

The first client device 210, second client device 215, third client device 220, fourth client device 225, search engine server 230, analytics server 235, and/or abnormal organization rating detection server 240 may be computing devices 100 and/or contain components of computing devices 100. As an example only, the first client device 210 may be implemented as a smartphone, the second client device 215 may be implemented as a laptop, the third client device 220 may be implemented as a smartphone and the fourth client device 225 may be implemented as a tablet. In some non-limiting embodiments of the present technology, the communications network 205 can be implemented as the Internet. In other embodiments of the present technology, the communications network 205 can be implemented differently, such as any wide-area communications network, local-area communications network, a private communications network and the like.

How the communication link 245 is implemented is not particularly limited and will depend on how the first client device 210, the second client device 215, the third client device 220 and the fourth client device 225 are implemented. Merely as an example and not as a limitation, in those embodiments of the present technology where at least one of the first client device 210, the second client device 215, the third client device 220 and the fourth client device 225 is implemented as a wireless communication device (such as a smart-phone), the communication link 245 can be implemented as a wireless communication link (such as but not limited to, a 3G communications network link, a 4G communications network link, a Wireless Fidelity, or WiFi® for short, Bluetooth® and the like). In those examples, where at least one of the first client device 210, the second client device 215, the third client device 220 and the fourth client device 225 are implemented respectively as laptop, smartphone, tablet computer, the communication link 245 can be either wireless (such as the Wireless Fidelity, or WiFi® for short, Bluetooth® or the like) or wired (such as an Ethernet based connection).

It should be expressly understood that implementations for the first client device 210, the second client device 215, the third client device 220, the fourth client device 225, the communication link 245 and the communications network 205 are provided for illustrative purposes only. As such, those skilled in the art will easily appreciate other specific implementation details for the first client device 210, the second client device 215, the third client device 220, the fourth client device 225 and the communication link 245 and the communications network 205. As such, by no means are examples provided herein above meant to limit the scope of the present technology.

While only four client devices 210, 215, 220 and 225 are illustrated, it is contemplated that any number of client devices 210, 215, 220 and 225 could be connected to the system 200. It is further contemplated that in some implementations, the number of client devices 210, 215, 220 and 225 included in the system 200 could number in the tens or hundreds of thousands.

Also coupled to the communications network 205 is the aforementioned search engine server 230. The search engine server 230 can be implemented as a conventional computer server. In an example of an embodiment of the present technology, the search engine server 230 can be implemented as a Dell™ PowerEdge™ Server running the Microsoft™ Windows Server™ operating system. Needless to say, the search engine server 230 can be implemented in any other suitable hardware and/or software and/or firmware or a combination thereof. In the depicted non-limiting embodiment of present technology, search engine server 230 is a single server. In alternative non-limiting embodiments of the present technology, the functionality of the search engine server 230 may be distributed and may be implemented via multiple servers. In some embodiments of the present technology, the search engine server 230 is under control and/or management of a search engine operator. Alternatively, the search engine server 230 can be under control and/or management of a service provider.

Generally speaking, the purpose of the search engine server 230 is to (i) execute searches; (ii) execute analysis of search results and perform ranking of search results; (iii) group results and compile the search result page (SERP) to be outputted to an electronic device (such as one of the first client device 210, the second client device 215, the third client device 220 and the fourth client device 225).

How the search engine server 230 is configured to execute searches is not particularly limited. Those skilled in the art will appreciate several ways and means to execute the search using the search engine server 230 and as such, several structural components of the search engine server 230 will only be described at a high level. The search engine server 230 may maintain a search log database 250. In some embodiments of the present technology, the search engine server 230 can execute several searches, including but not limited to, a general search and a vertical search.

The search engine server 230 is configured to perform general web searches, as is known to those of skill in the art. The search engine server 230 is also configured to execute one or more vertical searches, such as an images vertical search, a music vertical search, a video vertical search, a news vertical search, a maps vertical search and the like. The search engine server 230 is also configured to, as is known to those of skill in the art, execute a crawler algorithm—which algorithm causes the search engine server 230 to "crawl" the Internet and index visited web sites into one or more of the index databases, such as the search log database 250.

The search engine server 230 is configured to generate a ranked search results list, including the results from the general web search and the vertical web search. Multiple algorithms for ranking the search results are known and can be implemented by the search engine server 230.

Just as an example and not as a limitation, some of the known techniques for ranking search results by relevancy to the user-submitted search query are based on some or all of: (i) how popular a given search query or a response thereto is in searches; (ii) how many results have been returned; (iii) whether the search query contains any determinative terms (such as "images", "movies", "weather" or the like), (iv) how often a particular search query is typically used with determinative terms by other users; and (v) how often other uses performing a similar search have selected a particular resource or a particular vertical search results when results were presented using the SERP. The search engine server 230 can thus calculate and assign a relevance score (based on the different criteria listed above) to each search result obtained in response to a user-submitted search query and generate an SERP, where search results are ranked according to their respective relevance scores. In the present embodiment, the search engine server 230 may execute a plurality of machine learning algorithms for ranking documents and/or generate features for ranking documents.

The search engine server 230 typically maintains the search log database 250. Generally, the search log database 250 may maintain an index 255, a user interaction log 260, and a rating log 265. Although described herein as part of the search log database 250, the index 255, user interaction log 260, and/or rating log 265 may be separate from the search log database 250.

The search engine server 230, and/or any other server, may receive and/or manage user-submitted organization ratings. The option to rate an organization may be included in an SERP and/or any other webpage. The search engine server 230 may receive the organization rating and store a record of the organization rating in a rating log 265.

The purpose of the index 255 is to index documents, such as, but not limited to, web pages, images, PDFs, Word™ documents, PowerPoint™ documents, that have been crawled (or discovered) by the crawler of the search engine server 230. As such, when a user of one of the first client device 210, the second client device 215, the third client device 220, and the fourth client device 225 inputs a query and performs a search on the search engine server 230, the search engine server 230 analyzes the index 255 and retrieves documents that contain terms of the query, and ranks them according to a ranking algorithm.

The purpose of the user interaction log 260 is to log searches that were made using the search engine server 230. More specifically, the user interaction log 260 maintains terms of search queries (i.e. the associated search words) and the associated search results. It is noted that the user interaction log 260 can be maintained in an anonymized manner—i.e. search queries are not trackable to the users who have submitted the search query.

More specifically, the user interaction log 260 may include a list of queries with their respective terms, with information about documents that were listed by the search engine server 230 in response to a respective query, a timestamp, and may also contain a list of users identified by anonymous IDs (or without an ID altogether) and the respective documents they have clicked on after submitting a query. In some embodiments, the user interaction log 260 may be updated every time a new search is performed on the search engine server 230. In other embodiments, the user interaction log 260 may be updated at predetermined times. In some embodiments, there may be a plurality of copies of the user interaction log 260, each corresponding to the user interaction log 260 at different points in time.

The user interaction log 260 may also list user interaction parameters as tracked by the analytics server 235 after a user has submitted a query and clicked on one or more documents in a SERP on the search engine server 230. As a non-limiting example, the user interaction log 260 may contain reference to a document, which may be identified by an ID number or an URL, a list of queries, where each query of the list of queries is associated with a plurality of user interaction parameters, which will be described in more detail in the following paragraphs. The plurality of user interaction parameters may generally be tracked and compiled by the analytics server 235, and in some embodiments may be listed for each individual user.

Non-limiting examples of user interactions tracked by the user interaction log 260 include (but are not limited to):
 Loss/Win: was the document clicked in response to the search query or not.
 Dwell time: time a user spends on a document before returning to the SERP.
 Long/short click: was the user interaction with the document long or short, compared to the user interaction with other documents on the SERP.

Naturally, the above list is non-exhaustive and may include other types of user interactions without departing from the scope of the present technology. In some embodiments, the analytics server 235 may compile user interaction data (which may, as a non-limiting example, include user interactions for every hour) and generate user interactions to be stored in the user interaction log 260 in a suitable format for implementing the present technology (which, may as a non-limiting example, be user interactions for a predetermined period of time of 3 months). In other embodiments, the user interaction log 260 may store the user interaction data in a raw form, such that it can retrieved and compiled by at least one of the search engine server 230, the analytics server 235, the abnormal organization rating detection server 240, or another server (not depicted) in a suitable format for implementing the present technology.

The rating log 265 includes user submitted ratings of organizations. Each entry in the rating log 265 may include a user identifier such as an IP address, username, email address etc. Each entry may include an indication of the organization being rated, such as a web host of the organization, a name of the organization, a physical address of the organization, contact information of the organization. Although described as an organization herein, it should be understood that the rating may be of a person and/or any other type of entity. Each entry in the rating log 265 may include a timestamp for the rating. Each entry may include a rating, which may be a binary rating, scale rating, and/or any other type of rating.

Also coupled to the communications network 205 is the above-mentioned analytics server 235. The analytics server 235 can be implemented as a conventional computer server. In an example of an embodiment of the present technology, the analytics server 235 can be implemented as a Dell™ PowerEdge™ Server running the Microsoft™ Windows Server™ operating system. Needless to say, the analytics server 235 can be implemented in any other suitable hardware and/or software and/or firmware or a combination thereof. In the depicted non-limiting embodiment of present technology, the analytics server 235 is a single server. In alternative non-limiting embodiments of the present technology, the functionality of the analytics server 235 may be distributed and may be implemented via multiple servers. In other embodiments, the functionality of the analytics server 235 may be performed completely or in part by the search engine server 230. In some embodiments of the present technology, the analytics server 235 is under control and/or management of a search engine operator. Alternatively, the analytics server 235 can be under control and/or management of another service provider.

Generally speaking, the purpose of the analytics server 235 is to analyze user interactions with search results provided by the search engine server 230 in response to user requests (e.g. made by users of one of the first client device 210, the second client device 215, the third client device 220 and the fourth client device 225) based on data stored in the user interaction log 260.

Non-limiting examples of user interaction parameters generated by the analytics server 235 include (but are not limited to):
 Click-through rate (CTR): Number of clicks on an element divided by the number of times the element is shown (impressions).
 Session Time: Mean session time, measured in seconds.
 Log Session Time: Mean logarithmic value of session times.
 Queries: The number of queries submitted by a user.
 Clicks: The number of clicks performed by a user.
 Clicks per Query: The average number of clicks per query for the user.
 Daily Active Users (DAU): Number of unique users engaging with the service during a day.
 Average daily sessions per user (S/U): u S(u)|u|, where S(u) indicates user u's daily session number and |u| is the total number of users on that day.
 Average unique queries per session (UQ/S): s UQ(s)|s|, where UQ(s) represents the number of unique queries within session s, and |s| the total number of sessions on that day.
 Average session length per user (SL/U): the total number of queries within a session, averaged over each user.
 Percentage of navigational queries per user (%-Nav-Q/U): click positions: if over n % of all clicks for a query is concentrated on top-3 ranked URLs, this query is considered to be navigational. Otherwise it is treated as informational. The value of n may be set to 80.
 Average query length per user (QL/U): the query length measures the number of words in a user query.
 Average query success rate per user (QSuccess/U): a user query is said to be successful if the user clicks one or more results and stays at any of them for more than 30 seconds.

Average query interval per user (QI/U): the average time difference between two consecutive user queries within a user session.

Dwell time: time a user spends on a document before returning to the SERP.

Naturally, the above list is non-exhaustive and may include other types of user interaction parameters without departing from the scope of the present technology.

The analytics server 235 may transmit the tracked user interaction parameters to the search engine server 230 such that it can be stored in the user interaction log 260. In some embodiments, the analytics server 235 may store the user interaction parameters and associated search results locally in a user interaction log (not depicted). In alternative non-limiting embodiments of the present technology, the functionality of the analytics server 235 and the search engine server 230 can be implemented by a single server.

Also coupled to the communications network 205 is the above-mentioned abnormal organization rating detection server 240. The abnormal organization rating detection server 240 can be implemented as a conventional computer server. In an example of an embodiment of the present technology, the abnormal organization rating detection server 240 can be implemented as a Dell™ PowerEdge™ Server running the Microsoft™ Windows Server™ operating system. Needless to say, the abnormal organization rating detection server 240 can be implemented in any other suitable hardware and/or software and/or firmware or a combination thereof. In the depicted non-limiting embodiment of present technology, the abnormal organization rating detection server 240 is a single server. In alternative non-limiting embodiments of the present technology, the functionality of the abnormal organization rating detection server 240 may be distributed and may be implemented via multiple servers. In the context of the present technology, the abnormal organization rating detection server 240 may implement in part the methods and system described herein. In some embodiments of the present technology, the abnormal organization rating detection server 240 is under control and/or management of a search engine operator. Alternatively, the abnormal organization rating detection server 240 can be under control and/or management of another service provider.

Generally speaking, the purpose of the abnormal organization rating detection server 240 is to identify abnormal organization ratings and/or users performing abnormal organization ratings. As described in further detail below, the abnormal organization rating detection server 240 may, as an example, analyze the rating log 265 to identify abnormal organization ratings and/or users performing abnormal organization ratings.

Figure 3:
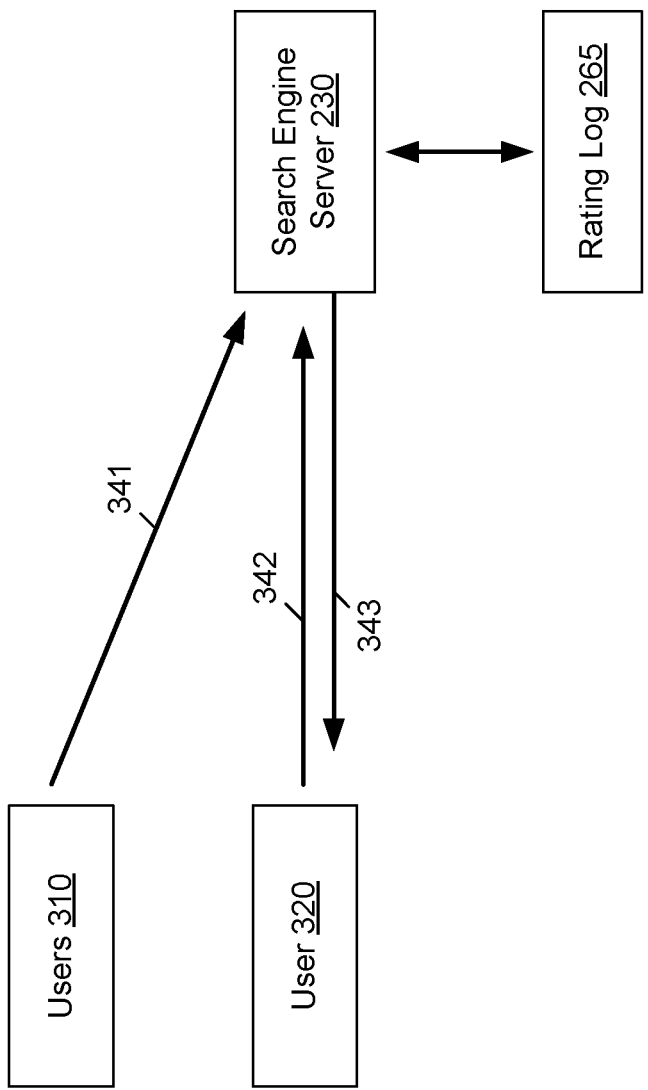
FIG. 3 depicts a diagram of users submitting naturally occurring organization ratings in accordance with embodiments of the present technology.

Now turning to FIG. 3, a diagram of users submitting naturally occurring organization ratings is illustrated. As discussed above, the search engine server 230 receives organization ratings submitted by users. Although described herein as a search engine server 230, another type of server may be used to receive and/or manage organization ratings.

Typically, users 310 may submit organization ratings to the search engine server 230 via communications 341. The ratings may be binary ratings, scale ratings, textual reviews, and/or any other type of rating. These ratings may be based on the users' 310 opinions of the organizations that they are ranking. The search engine server 230 may store the organization ratings in the rating log 265.

User 320 may, via communications 342, request information from the search engine server 230. The search engine server 230 may, based on the information communicated in the communication 342, retrieve organization ratings from the rating log 265. The search engine server 230 may then transmit, via communications 343, information responsive to the user's 320 request. The reply to the user 320 may include organization ratings for organizations in the reply. These organization ratings may be based on the ratings submitted by the users 310, and may reflect the users 310 actual opinions of the organizations. For example, the users 310 may submit, via communications 341, organization ratings for various automobile technicians. The user 320 may then request information regarding automobile technicians. The user 320 may then receive an SERP listing various automobile technicians as well as the corresponding individual or overall organization ratings for those automobile technicians. The user 320 may then use those organization ratings to select the automobile technician that they wish to use.

Figure 4:
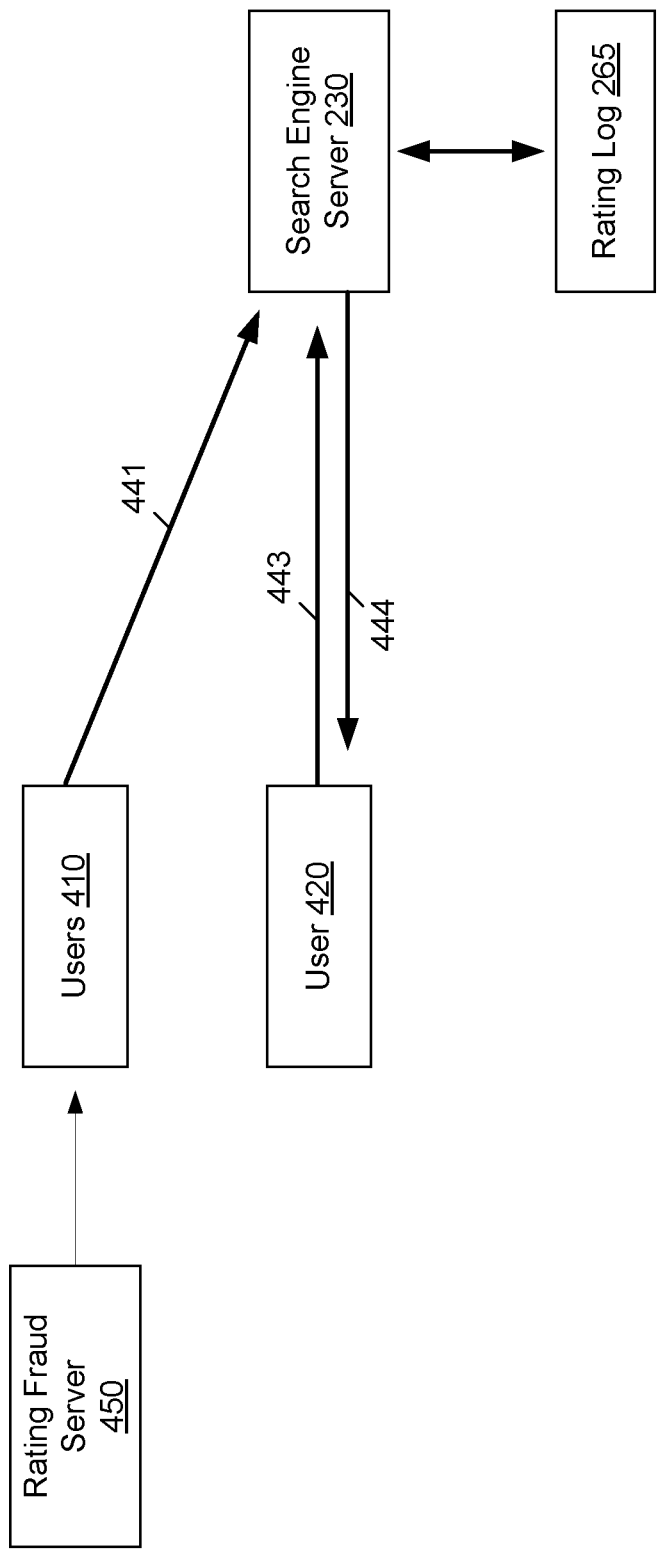
FIG. 4 depicts a diagram of users submitting abnormal organization ratings in accordance with embodiments of the present technology.

The user 320 may assume that the organization ratings that they are viewing are based on the actual opinions of the users 310, and reflect the users' 310 natural opinions of the organizations that they have rated. But, as described above, bad actors may wish to influence organization ratings. FIG. 4 depicts a diagram of users submitting abnormal organization ratings in accordance with embodiments of the present technology.

In FIG. 4, the users 410 receive instructions from the rating fraud server 450. The instructions may include which organizations the users 410 should submit ratings for, and what rating to give those organizations. For example the instructions may indicate that the users 410 should submit the highest possible rating for an organization that the operator of the rating fraud server 450 wishes to promote, and/or a lowest possible rating for an organization that is a competitor of that organization the operator of the rating fraud server 450 wishes to promote. These user-submitted organization ratings that are submitted based on instructions from an outside influence are referred to herein as abnormal organization ratings.

The users 410 may submit the abnormal organization ratings, as instructed by the rating fraud server 450, to the search engine server 230 via communications 441. The search engine server 230 may store the abnormal organization ratings in the rating log 265.

The user 420 may then request, via communications 443, information from the search engine server 230. The request may be a request for a listing of organizations. The search engine server 230, after receiving the request from the user 420, may retrieve responsive organization rating information from the rating log 265. The retrieved information may be influenced by the abnormal organization ratings submitted by the users 410. The search engine server 230 may then transmit, via communications 444, the organization rating information to the user 420.

Although the user 420 expects to receive organization ratings that reflect the actual beliefs of the users 410 that submitted the organization ratings, the user 420 is actually receiving abnormal organization ratings influenced by the rating fraud server 450. For example the user 420 may be told that an organization has a very high rating, when the organization would have had a very low natural rating were it not for the abnormal organization ratings. The user 420 may then select that organization based on the very high rating, and the user 420 might be disappointed by the performance of the organization that they selected. The user 420 may then have a negative opinion of the organization operating the search engine server 230, and/or question the accuracy of organization ratings provided by the search engine server 230. Method 500, described in further detail below, may be used to detect and/or remove abnormal organization ratings that were influenced by a bad actor, such as the rating fraud server 450.

Method (Non-Limiting Embodiment)

Figure 5:
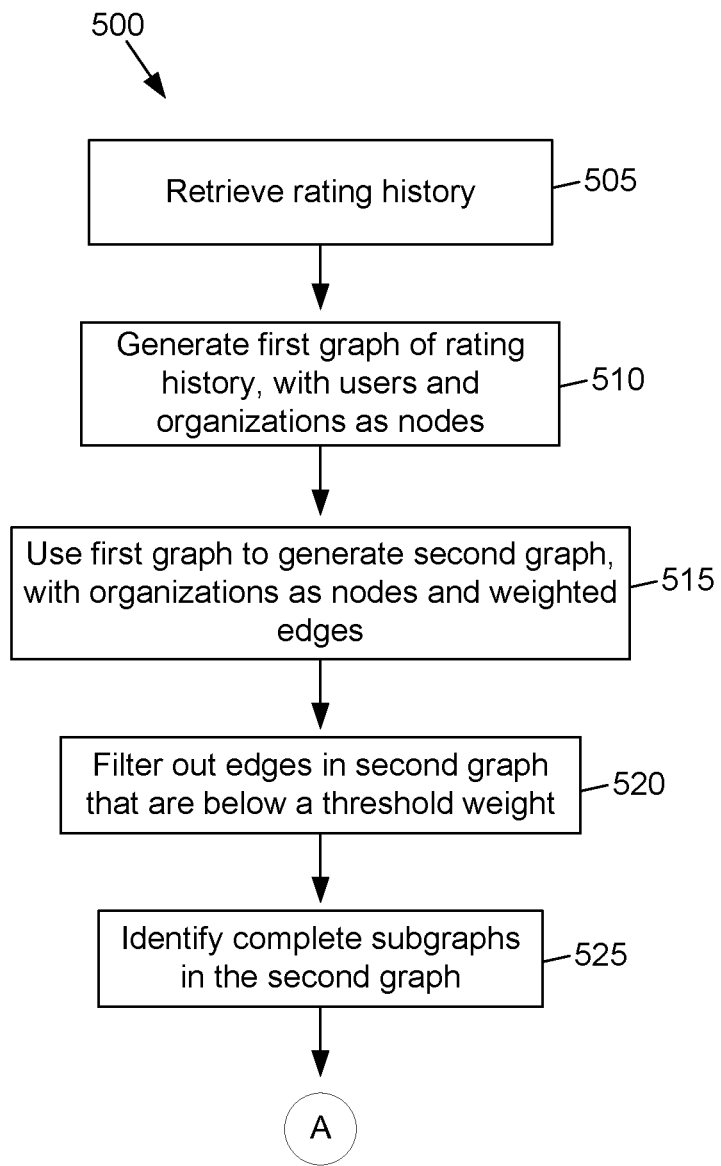
FIGS. 5 and 6 depict a flow diagram of a method for determining users performing abnormal organization ratings, the method executable within the system of FIG. 2 in accordance with some non-limiting embodiments of the present technology.
Figure 6:
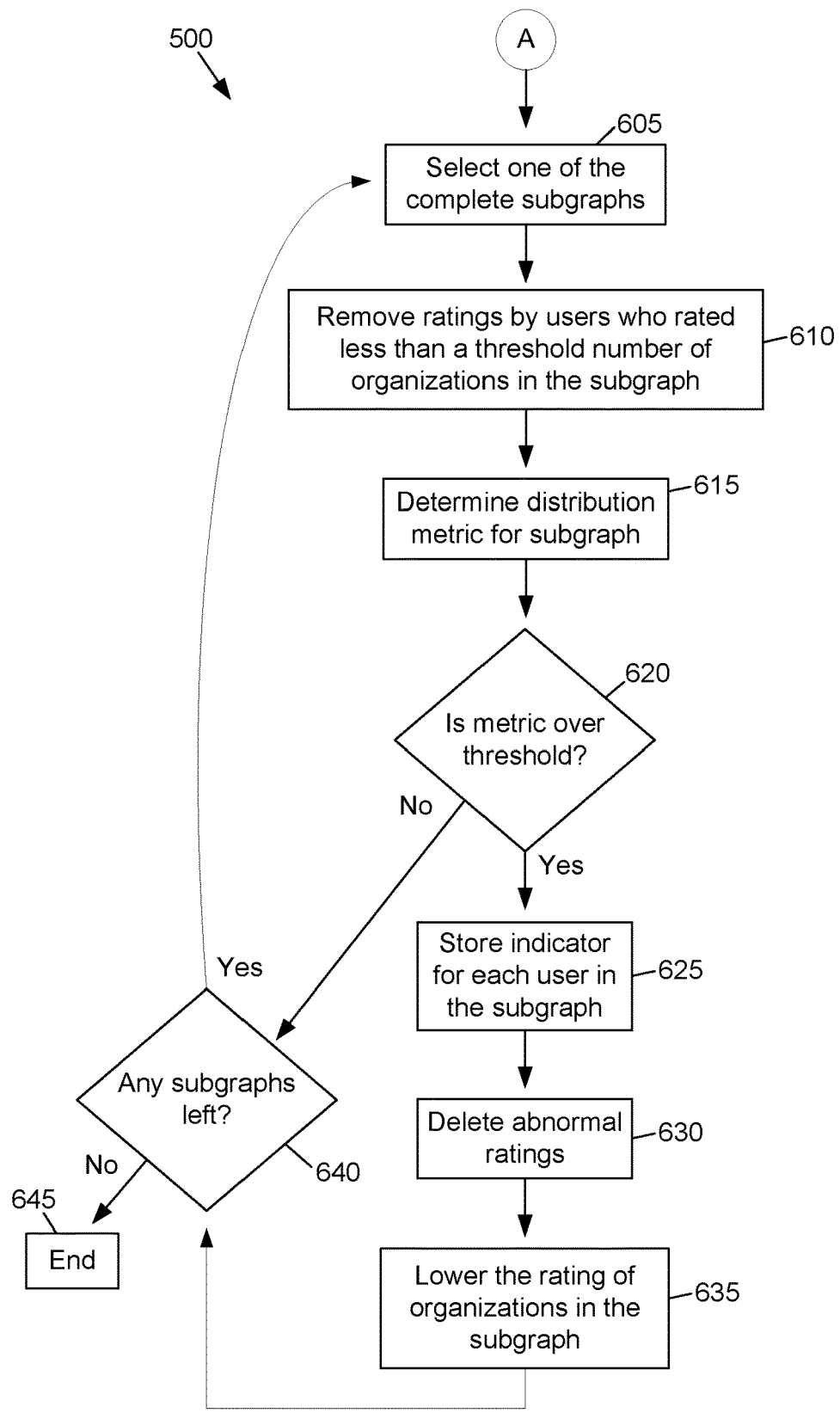

With reference to FIGS. 5 and 6, there is depicted a flow chart of a method 500, the method 500 being implementable in accordance with non-limiting embodiments of the present technology.

Step 505—Retrieve Organization Rating History

The method 500 begins at step 505. At step 505 organization rating history may be retrieved. The organization rating history may be retrieved from the rating log 265. As described above, the organization rating history may include user-submitted ratings of organizations. Each of the organization ratings in the organization rating history may include a username, user ID, IP address, or other user identifier. Each organization rating may include a timestamp indicating when the organization rating was submitted. Each organization rating may include an identifier of the organization being rated, such as a web host address of the organization. Each organization rating may include a geographic location and/or region of the user that submitted the organization rating. Each organization rating may include a scale rating, binary rating, text rating, and/or any other type of rating of the organization.

The retrieved organization rating history may correspond to a specified window of time. For example, organization rating history from the past thirty days may be retrieved. One or more database queries may be used to retrieve the organization rating history. The query may indicate the time period, region, and/or other filters to be applied to the organization rating history.

Step 510—Generate a First Graph of the Organization Rating History

Figure 7:
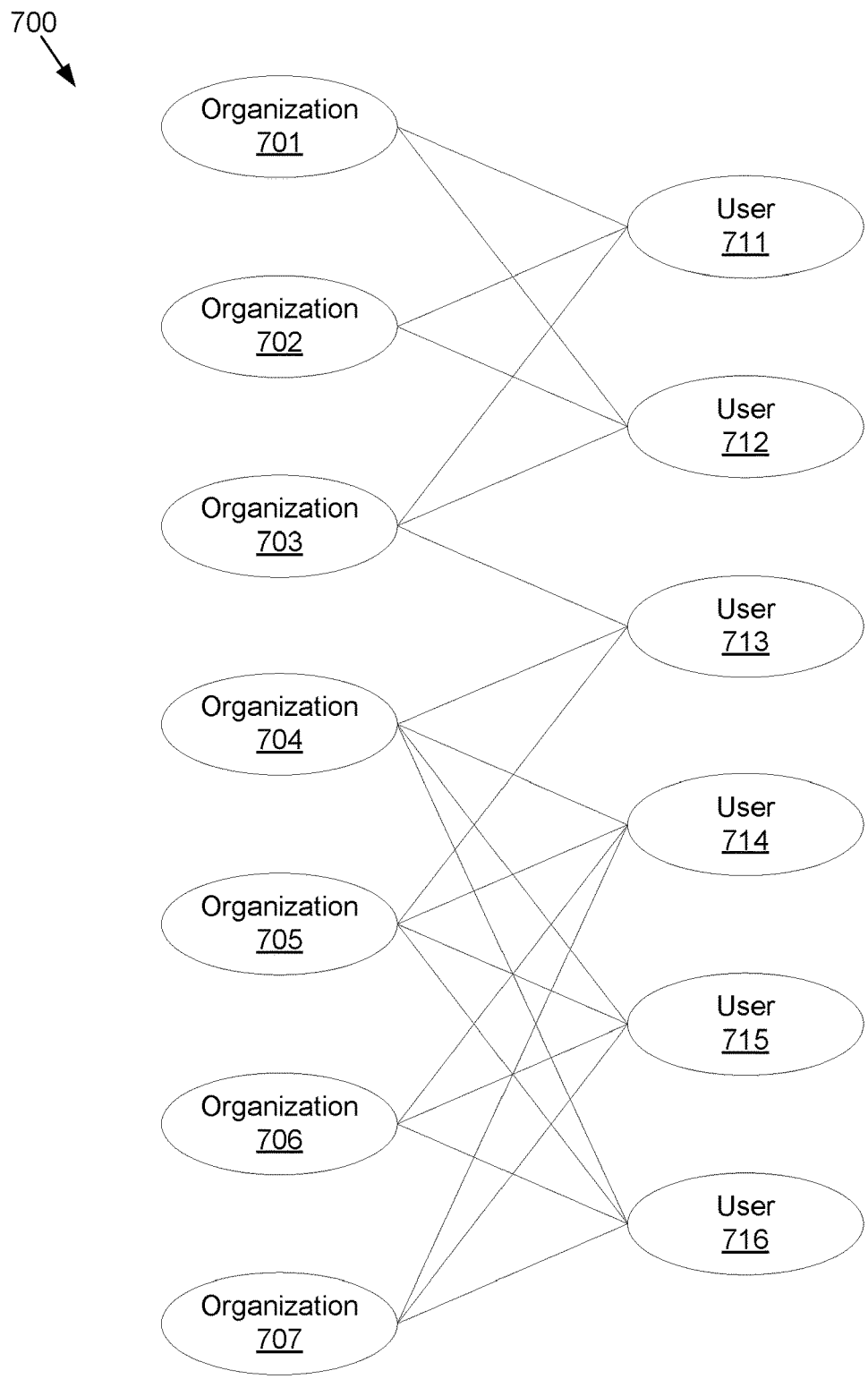
FIG. 7 depicts a graph of organization rating activity in accordance with embodiments of the present technology.

After retrieving the organization rating history at step 505, a graph of the organization rating history may be generated at step 510. FIG. 7, described in further detail below, illustrates an example of a graph of the organization rating history that may be generated at step 510. Each organization in the organization rating history may be included in the graph as a node. Each user in the organization rating history may also be included in the graph as a node. The users may be represented by user IDs or any other type of identifier.

Organizations having fewer than a minimum threshold number of ratings and/or organizations having greater than a maximum threshold number of ratings might not be included in the graph. The minimum and/or maximum threshold number of ratings may be pre-determined. Although a threshold is described, any other selection criteria may be used for selecting which organizations are included in the graph. The efficiency of the method 500 may be improved by not including these organizations that have a very low or very high number of ratings in the graph.

Nodes in the graph may be connected by edges. For each rating in the organization rating history, an edge may be included in the graph that connects the user that submitted the organization rating to the organization that the user rated. The edges may be unweighted and/or may all have a same weight.

Although described as a graph, it should be understood that other data structures may be used to represent the organization rating history.

Step 515—Generate a Second Graph of the Rating History

Figure 8:
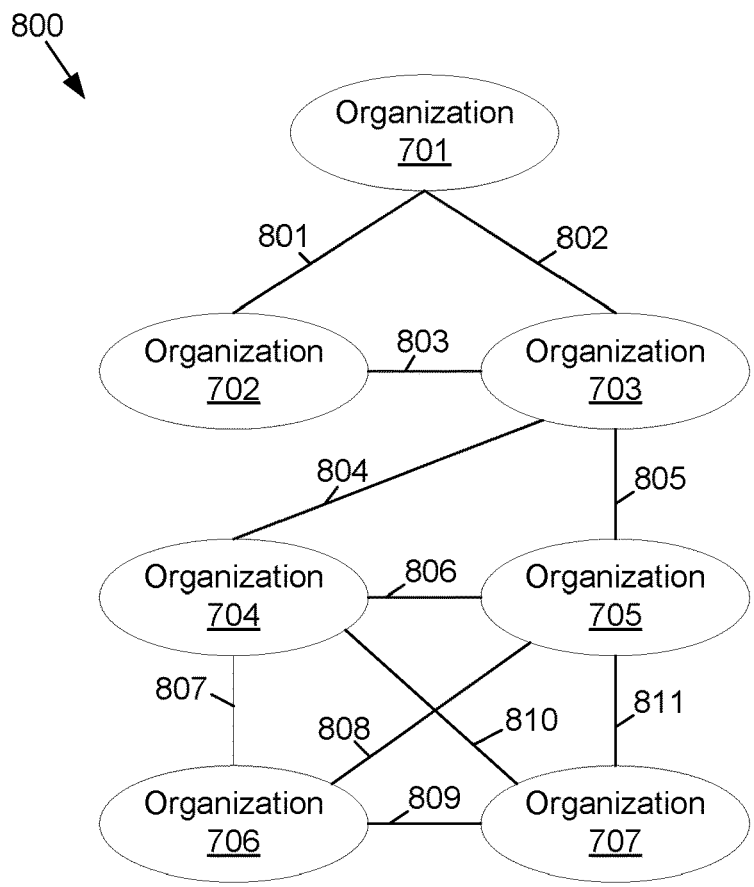
FIG. 8 depicts another graph of organization rating activity in accordance with embodiments of the present technology.

The graph generated at step 510 may be used to generate a second graph at step 515. FIG. 8, described in further detail below, illustrates an example of a graph of the organization rating history that may be generated at step 515. In the second graph, each organization in the graph generated at step 510 may be a node. Unlike the graph generated at step 510, the second graph might not have any nodes representing users.

The organizations in the second graph may be connected by weighted edges. Edges may connect organizations that were rated by a same user. For example if a single user rated a first organization, a second organization, and a third organization, a first edge may connect the first organization to the second organization, a second edge may connect the first organization to the third organization, and a third edge may connect the second organization to the third organization.

The edges may be assigned a weight based on the number of common users that rated both of the organizations connected by the edge. For example if three users rated a first organization, and the same three users rated a second organization, an edge connecting the first organization and the second organization may be assigned a weight of three.

Although the graph generated at step 515 is described as a second graph, it should be understood that this graph may be generated without having previously generated the graph at step 510. It should also be understood that, although described as a graph, any other suitable data structure may be generated at step 515.

Step 520—Filter Out Edges in Second Graph of the Rating History

At step 520 edges in the second graph that are below a threshold weight may be filtered out. The threshold weight may be predetermined. The threshold weight may be determined based on various attributes of the second graph, such as a total number of reviews represented in the second graph. Edges in the second graph generated at step 515 that have less than the threshold weight may be removed from the second graph. For example, if the threshold weight is four, and two organizations were rated by two common users, the edge connecting those two organizations would be removed.

Step 525—Identify Complete Subgraphs in the Second Graph

At step 525 complete subgraphs in the second graph may be identified. Complete subgraphs are subgraphs in which every node of the subgraph is connected to every other node of the subgraph by an edge. In other words, a complete subgraph would include a group of organizations, where each organization in the subgraph was rated by at least one same user as every other organization in the subgraph. The identified subgraphs may have a minimum size and/or a minimum sum of edge weights. The minimum size and/or minimum sum may be predetermined. The minimum size may be a minimum number of nodes. The complete subgraphs may include the nodes of the organizations in the subgraph and the weighted edges connecting the nodes.

Step 605—Select One of the Complete Subgraphs

After identifying complete subgraphs at step 525, one of the complete subgraphs may be selected at step 605. The subgraphs may be selected in any order. A pre-determined selection criteria may be used for selecting subgraphs, such as selecting the subgraph having the most organizations first, then selecting the subgraph having the next-most organizations, etc.

Step 610—Filter Out Ratings in the Selected Subgraph

At step 610 ratings made by users who rated fewer than a threshold number of organizations in the subgraph selected at step 605 may be removed from consideration. Information corresponding to the users who rated fewer than the threshold number of organizations in the subgraph may be removed from the subgraph. For example, the edge weights in the graph may be adjusted at step 610.

A list, or any other suitable format, may be generated of all ratings of the organizations in the subgraph. The ratings may be in the rating history retrieved at step 505. For each user who has rated an organization in the subgraph, a total number of organizations in the subgraph that the user has rated may be determined. The rating history may be used to determine the number of organizations in the subgraph that the user has rated. If the total number of organizations in the subgraph that the user has rated is fewer than a threshold number of organizations, the organization ratings submitted by that user may be removed from the list. The threshold number of organizations may be a pre-determined number of organizations. The threshold number of organizations may be determined based on the number of organizations in the subgraph.

Users who have submitted ratings for fewer than the threshold number of organizations in the subgraph may be less likely to be users submitting abnormal ratings. Rather, these users are likely to be providing naturally occurring ratings based on their actual experiences. It may improve the accuracy and/or efficiency of the method 500 to remove these ratings from consideration.

Step 615—Determine a Distribution Metric for the Subgraph

At step 615 a distribution metric of ratings may be determined for the subgraph. The list of ratings of organizations in the subgraph may be used to determine the distribution metric. The list of ratings might not include the ratings filtered out at step 610.

For binary ratings, the distribution metric may indicate whether the organization ratings in the ratings list are evenly distributed between positive and negative, highly positive, and/or highly negative. For scale ratings, the distribution metric may indicate whether the organization ratings in the ratings list are evenly distributed across the scale, concentrated at the ends of the scale, highly positive, and/or highly negative. The distribution metric may be, and/or may be based on, a metric of statistical dispersion, such as standard deviation, interquartile range, median absolute deviation (MAD), etc. Although described as a single distribution metric, multiple metrics may be used.

Step 620—is the Metric over a Threshold?

At step 620 the metric determined at step 615 may be compared to a threshold metric. The threshold metric may be pre-determined. The threshold metric may be selected to differentiate between ratings lists having abnormal ratings and ratings lists with naturally occurring ratings. For example, a percentage of the total ratings that are highest and/or lowest available ratings may be determined and compared to a threshold percentage. If the percentage is over the threshold percentage, in other words if there are an unusual amount of very high and/or very low ratings, the ratings are determined to be abnormal ratings. In another example, a number of ratings that are above a threshold high rating and/or below a threshold low rating may be determined and compared to a total number of ratings.

If the ratings of the subgraph are determined at step 620 to satisfy the threshold, then the ratings of the subgraph may be considered abnormal ratings. The method 500 may proceed to step 625. Steps 625, 630, and 635 describe various measures that may be taken to counteract the effects of abnormal organization ratings. If the metric determined at step 615 doesn't satisfy the threshold metric, the method 500 may proceed to step 640 and begin determining whether the organization ratings for a next complete subgraph contain abnormal organization ratings.

Step 625—Store Indicator for users who Rated Organizations in the Subgraph

As described above, if the ratings of the subgraph are determined, at step 620, to satisfy the threshold, then the ratings of the subgraph may be considered abnormal ratings. For each user that submitted a rating in the ratings list, an indicator may be stored indicating that the user has submitted abnormal ratings. The indicator may include an identifier of the user, such as a username, email address, IP address, user identifier (UID), etc. In order to counteract abnormal ratings, future ratings submitted by these users might not be saved in the rating log 265 and/or may be given less weight than organization ratings submitted by other users when determining overall ratings for an organization.

Step 630—Delete Abnormal Organization Ratings

At step 630 the abnormal organization ratings may be removed from where they are stored, such as by deleting them from the rating log 265. To counteract the effect of the abnormal organization ratings, those abnormal organization ratings may be deleted so as not to influence organization ratings that are presented to users and/or used for ranking organizations.

Step 635—Lower the Rating of Organizations in the Subgraph

At step 635 the organizations that were beneficiaries of the abnormal ratings may be penalized. The overall organization rating may be lowered for organizations in the subgraph that received highly positive ratings. The ranking of web pages of the organizations that were beneficiaries of the abnormal ratings may be reduced in SERPs.

Organizations that received abnormal organization ratings that were negative might not be penalized. Rather, the organizations that received abnormal ratings that were negative might be given a higher overall organization rating and/or may have their ranking boosted in search results to counteract the abnormal organization ratings.

Step 640—Determine Whether any Complete Subgraphs Remain

At step 640 a determination may be made as to whether all of the complete subgraphs determined at step 525 have been examined. If there are no complete subgraphs remaining, the method 500 ends at step 645. If there are remaining complete subgraphs to determine distribution metrics for, the method 500 may proceed to step 605 where a next subgraph will be selected.

Figure 9:
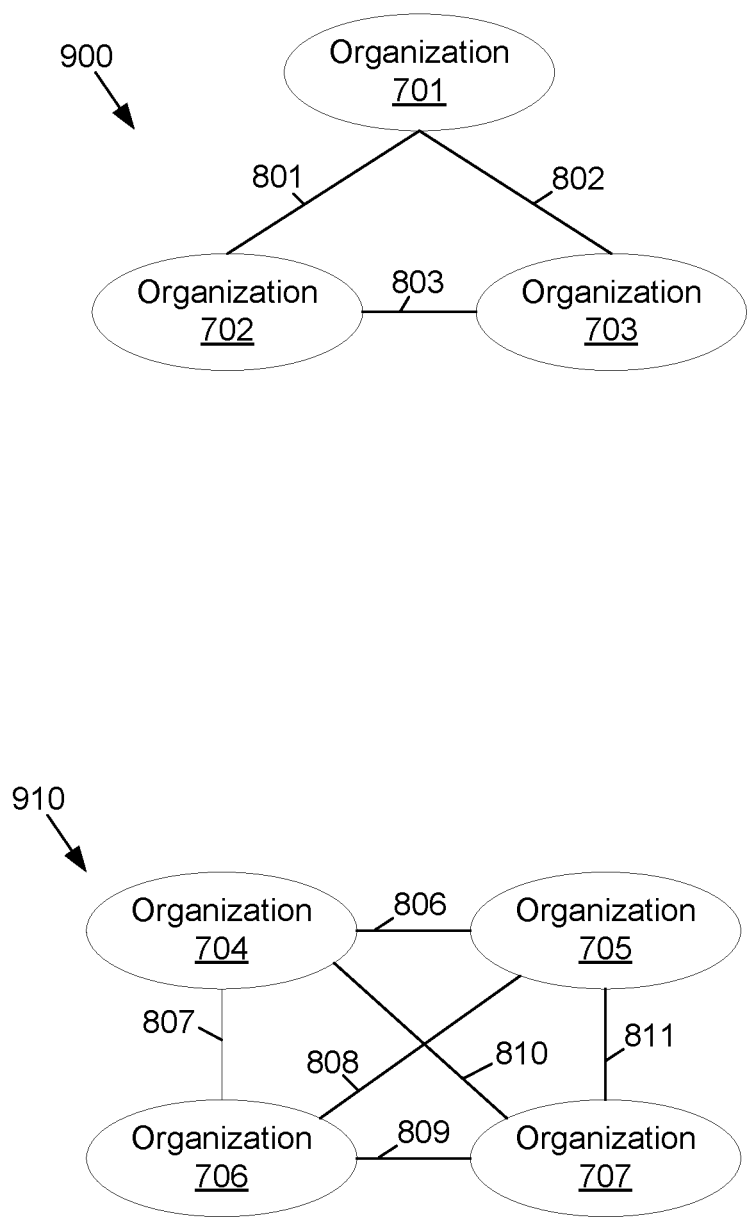
FIG. 9 depicts complete subgraphs of the graph of organization rating activity depicted in FIG. 8 in accordance with embodiments of the present technology.

Now turning to FIGS. 7-9, diagrams of a non-limiting example of application of the method 500 are illustrated. FIG. 7 depicts a graph 700 of organization rating activity in accordance with embodiments of the present technology. The graph 700 is an example of a graph that may be generated at step 510 of the method 500. The graph 700 includes nodes for both organizations and users. Organizations 701-07 are organizations that have been rated by users 711-16. Each organization 701-07 is represented in its own node, and each user 711-16 is represented in its own node. The edges indicate which organizations 701-07 were rated by which users 711-16. For example, as can be seen in the graph 700, user 711 rated organizations 701, 702, and 703.

FIG. 8 depicts a second graph 800 of organization rating activity in accordance with embodiments of the present technology. The graph 800 is an example of a graph that may be generated at step 515 of the method 500. The graph 700 may be used to generate the graph 800. Unlike the graph 700, the graph 800 doesn't include nodes for users. In graph 800, each organization 701-07 is represented with a node.

Weighted edges 801-11 connect each of the organizations 701-07. The weight of each of the edges 801-11 indicates how many common users rated both of the organizations that are connected by the respective edge 801-11. For example, as can be seen in the graph 700, organizations 703 and 705 were both rated by the user 713. The weight of the edge 805 that connects organizations 703 and 705 may be one. In another example, organizations 705 and 707 were both rated by users 714, 715, and 716. To indicate that three common users rated both organizations, the weight of the edge 811 connecting the organization 705 and 707 may be three.

Complete subgraphs may be identified in the graph 800, as described at step 525 of the method 500. FIG. 9 depicts complete subgraphs of the graph of organization rating activity depicted in FIG. 8 in accordance with embodiments of the present technology. Two complete subgraphs have been identified in the graph 800, subgraph 900 and subgraph 910. As can be seen in the Figure, every organization 701-03 in the subgraph 900 is connected to every other organization 701-03 in the subgraph 900 by one of the edges 801-03, and likewise for the subgraph 910.

As described above in regard to the method 500, a distribution metric may be determined for each of the subgraphs 900 and 910. The distribution metrics may be used to determine whether the organization ratings that formed the subgraphs 900 and 910 are abnormal organization ratings.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be used as examples rather than limiting. The scope of the present technology is therefore intended to be limited solely by the scope of the appended claims.

The invention claimed is:

1. A method for determining users performing abnormal organization ratings, the method executable on a server, the method comprising:
retrieving organization rating activity, wherein the organization rating activity comprises a plurality of organizations and one or more ratings for each organization;
generating a first graph of the organization rating activity, wherein each node in the first graph corresponds to either an organization of the plurality of organizations or a user that has rated an organization, and wherein each edge connects a user to an organization that the user has rated;
generating, based on the first graph, a second graph of the organization rating activity, wherein each node in the second graph corresponds to an organization of the plurality of organizations, wherein each edge of the second graph connects two organizations, and wherein each edge of the second graph is assigned a weight that indicates a number of users that have rated the two organizations connected by the respective edge;
removing, from the second graph, edges having a weight below a predetermined threshold weight;
determining, in the second graph, a complete subgraph, wherein each node in the subgraph is connected to all other nodes in the subgraph;
removing, from the subgraph, information corresponding to users who have rated fewer than a predetermined threshold number of organizations in the subgraph;
determining a distribution metric that represents a distribution of all ratings of the subgraph;
comparing the distribution metric to a threshold distribution to determine whether the distribution metric satisfies the threshold distribution; and
after determining that the distribution metric satisfies the threshold distribution, storing an indication that users corresponding to the subgraph are associated with abnormal organization ratings.

2. The method of claim 1, further comprising removing, from the organization rating activity, ratings corresponding to the users associated with abnormal organization ratings.

3. The method of claim 1, wherein the one or more ratings comprise binary ratings or scale ratings.

4. The method of claim 1, wherein the determining whether the distribution metric satisfies the threshold distribution comprises:
retrieving the ratings corresponding to the subgraph;
determining a percentage of the ratings that are highest or lowest available ratings; and
determining whether the percentage satisfies a threshold percentage.

5. The method of claim 1, wherein the retrieving the organization rating activity comprises retrieving organization rating activity that was collected during a predetermined time period.

6. The method of claim 1, wherein determining the distribution metric comprises:
retrieving the ratings corresponding to the subgraph;
determining a number of the ratings that are above a threshold high rating; and
determining a number of the ratings that are below a threshold low rating.

7. The method of claim 6, further comprising comparing the number of the ratings that are above the threshold high rating and the number of the ratings that are below the threshold low rating to a total number of the ratings.

8. The method of claim 1, wherein the determining the complete subgraph comprises determining a subgraph that contains at least a predetermined threshold number of nodes.

9. The method of claim 1, wherein comparing the distribution metric to the threshold distribution comprises:
comparing the distribution metric to a normal distribution.

10. The method of claim 1, wherein generating the second graph comprises, for each set of two organizations in the organization rating activity that were both rated by at least one same user:

determining, for the respective set of two organizations, a number of users that rated both organizations of the respective set of two organizations; and setting a weight of an edge connecting the two organizations of the respective set of two organizations to be equal to the number of users that rated both organizations.

11. A system for determining users performing abnormal organization ratings, the system comprising:

a processor; and a non-transitory computer-readable medium comprising instructions, the processor, upon executing the instructions, being configured to:

retrieve organization rating activity, wherein the organization rating activity comprises a plurality of organizations and one or more ratings for each organization;

generate a first graph of the organization rating activity, wherein each node in the first graph corresponds to either an organization of the plurality of organizations or a user that has rated an organization, and wherein each edge connects a user to an organization that the user has rated;

generate, based on the first graph, a second graph of the organization rating activity, wherein each node in the second graph corresponds to an organization of the plurality of organizations, wherein each edge of the second graph connects two organizations, and wherein each edge of the second graph is assigned a weight that indicates a number of users that have rated the two organizations connected by the respective edge;

remove, from the second graph, edges having a weight below a predetermined threshold weight;

determine, in the second graph, a complete subgraph, wherein each node in the subgraph is connected to all other nodes in the subgraph;

remove, from the subgraph, information corresponding to users who have rated fewer than a predetermined threshold number of organizations in the subgraph;

determine a distribution metric that represents a distribution of all ratings of the subgraph;

compare the distribution metric to a threshold distribution to determine whether the distribution metric satisfies the threshold distribution; and after determining that the distribution metric satisfies the threshold distribution, storing an indication that users corresponding to the subgraph are associated with abnormal organization ratings.

12. The system of claim 11, wherein the processor, upon executing the instructions, is further configured to remove, from the organization rating activity, ratings corresponding to the users associated with abnormal organization ratings.

13. A method for determining users performing abnormal organization ratings, the method executable on a server, the method comprising:

retrieving organization rating activity, wherein the organization rating activity comprises a plurality of organizations and one or more ratings for each organization;

determining, from the organization rating activity, a set of organizations, wherein each organization in the set of organizations shares, with every other organization in the set of organizations, at least one common user that has rated both organizations;

retrieving the ratings corresponding to the set of organizations;

determining a percentage of the ratings that are highest possible ratings;

comparing the percentage of the ratings that are highest possible ratings to a threshold percentage;

after determining that the percentage of the ratings that are highest possible ratings is greater than the threshold percentage, storing an indication that users that have rated two or more organizations in the set of organizations are associated with abnormal organization ratings.

14. The method of claim 13, further comprising removing, from the ratings, ratings corresponding to users who have rated fewer than a predetermined threshold number of organizations in the set of organizations.

* * * * *